United States Patent [19]

Donnelly et al.

[11] 4,043,447
[45] Aug. 23, 1977

[54] QUICK RELEASE TROUGHING ROLL MOUNTING

[75] Inventors: Charles E. Donnelly, Rexdale; Richard G. Sauve, Toronto, both of Canada

[73] Assignee: FMC Corporation, San Jose, Calif.

[21] Appl. No.: 637,447

[22] Filed: Dec. 3, 1975

[51] Int. Cl.² ............................................. B65G 15/08
[52] U.S. Cl. .................................................... 198/827
[58] Field of Search ............... 198/192 R, 192 A, 827, 198/825, 824

[56] References Cited

U.S. PATENT DOCUMENTS 3,038,588   6/1962   Arndt et al. ..................... 198/192 A

FOREIGN PATENT DOCUMENTS 58,899    9/1967   Germany ......................... 198/192 A
1,260,371  2/1968   Germany ......................... 198/192 A
1,265,651  4/1968   Germany ......................... 198/192 A Primary Examiner—Evon C. Blunk
Assistant Examiner—Douglas D. Watts
Attrorney, Agent, or Firm—J. F. Verehoeven; J. W. Edwards; C. E. Tripp

[57] ABSTRACT

A plurality of troughing rolls, that are suspended in a chain-like manner between opposite side frame members of a conveyor, support a conveyor belt so that the transverse cross-section of the belt defines a trough. The troughing rolls that are located adjacent each side of the conveyor belt are axially inclined in opposite directions. At least one arm is pivotally mounted on the frame and attached to the adjacent end of an inclined troughing roll. A locking pin is provided for retaining the arm in a first position where the troughing rolls support the conveyor belt. The locking pin can be readily moved to release the arm for pivoting to a second position where the troughing rolls are clear of the belt. The arm is mounted to pivot in a plane that is generally parallel to the adjacent inclined side edge of the belt. This plane is substantially the same plane in which extends the line of force that is applied to the arm by the troughing rolls in a belt supporting position. The pivotal axis of the arm is offset, perpendicularly, from the line of force, that is applied to the arm by the troughing rolls, when the troughing rolls are in a belt supporting position. The locking pin is positioned on this line of force.

5 Claims, 7 Drawing Figures

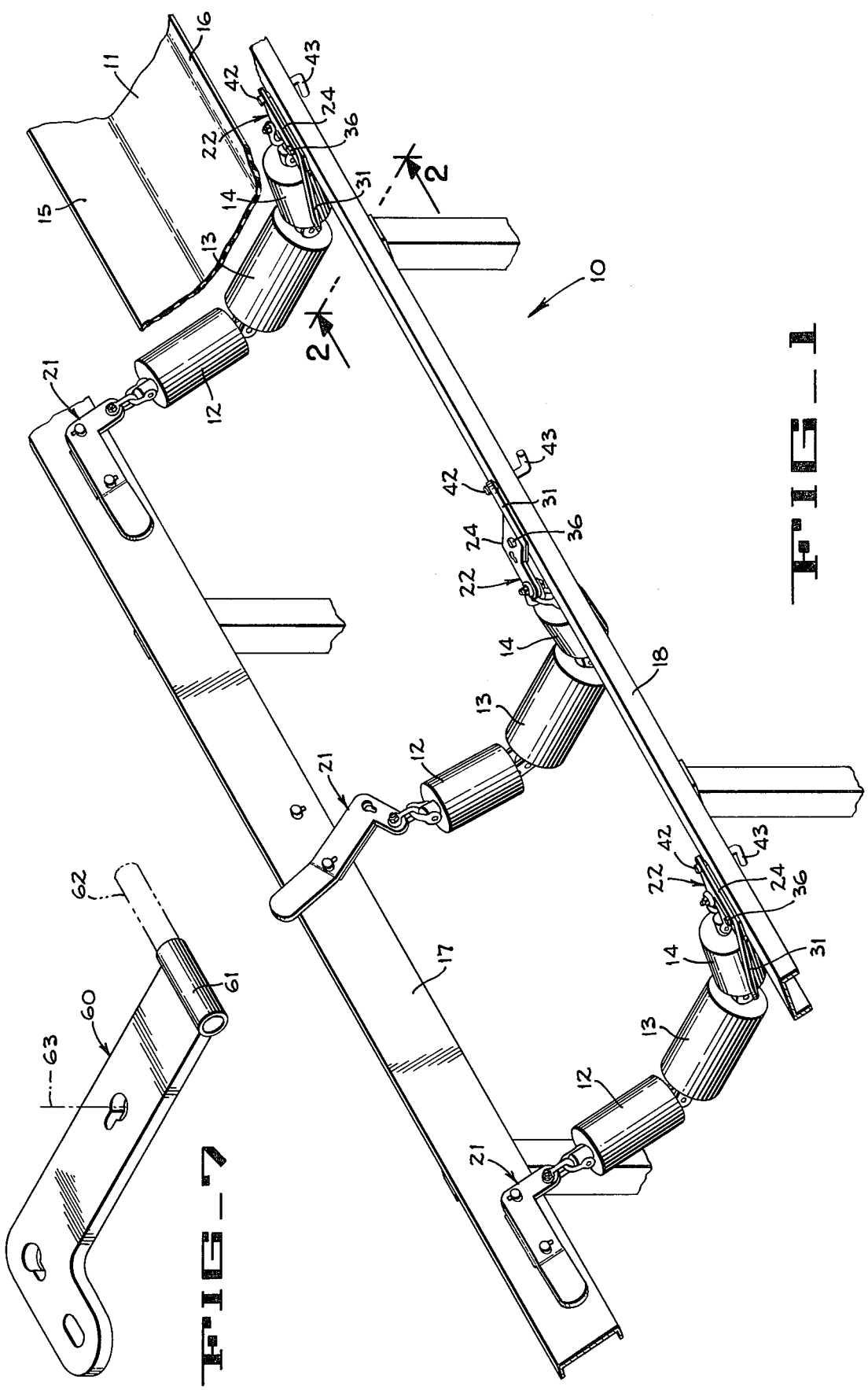

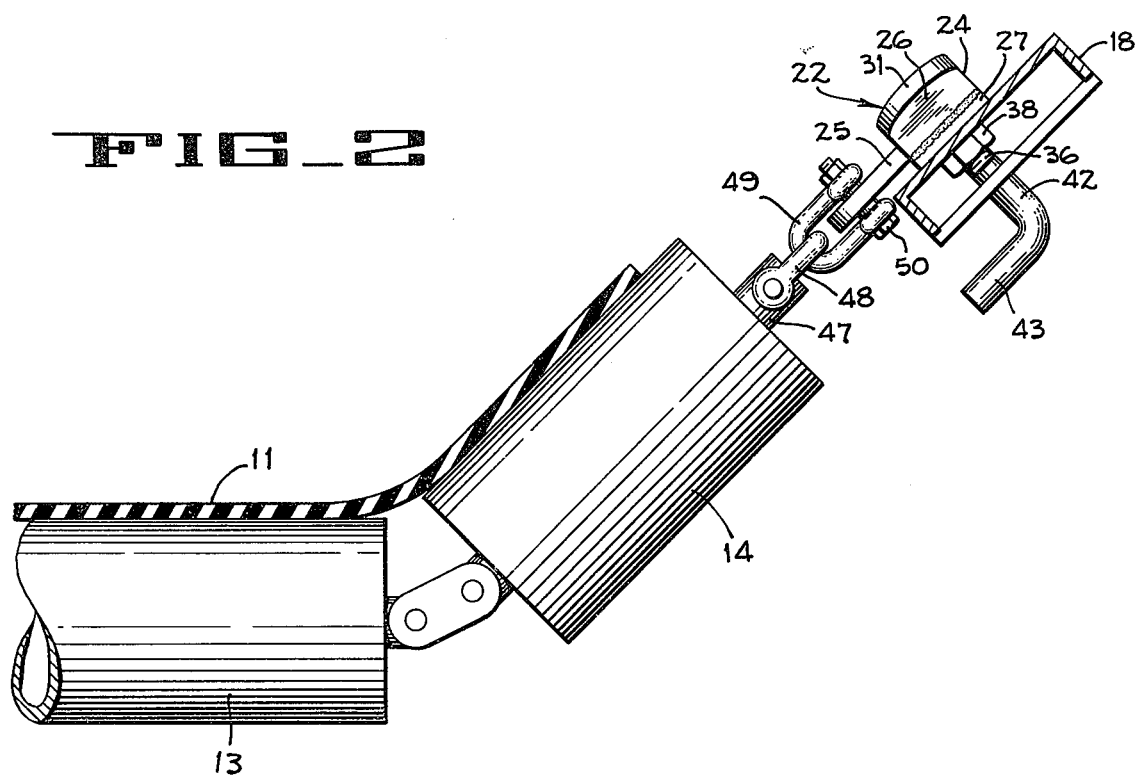
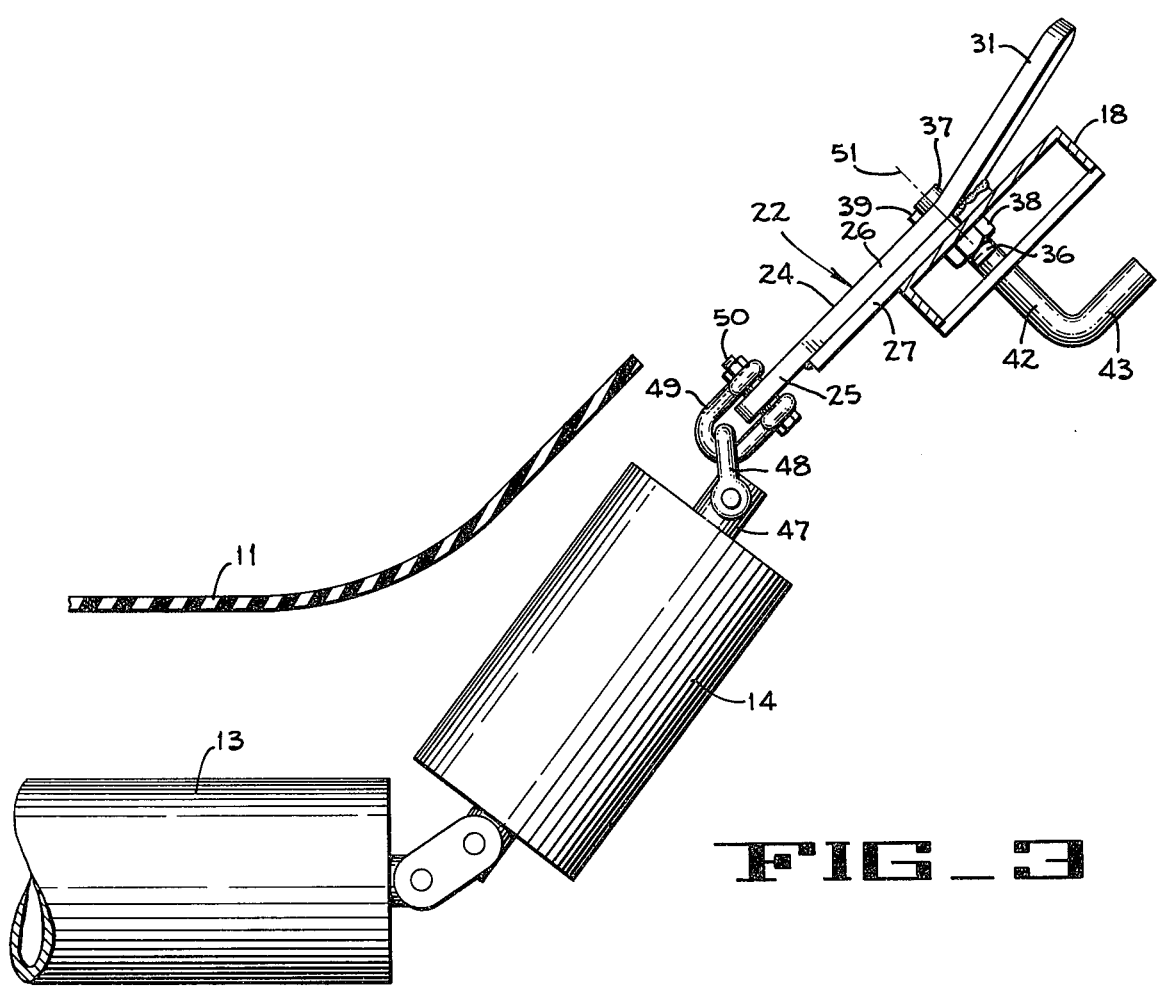

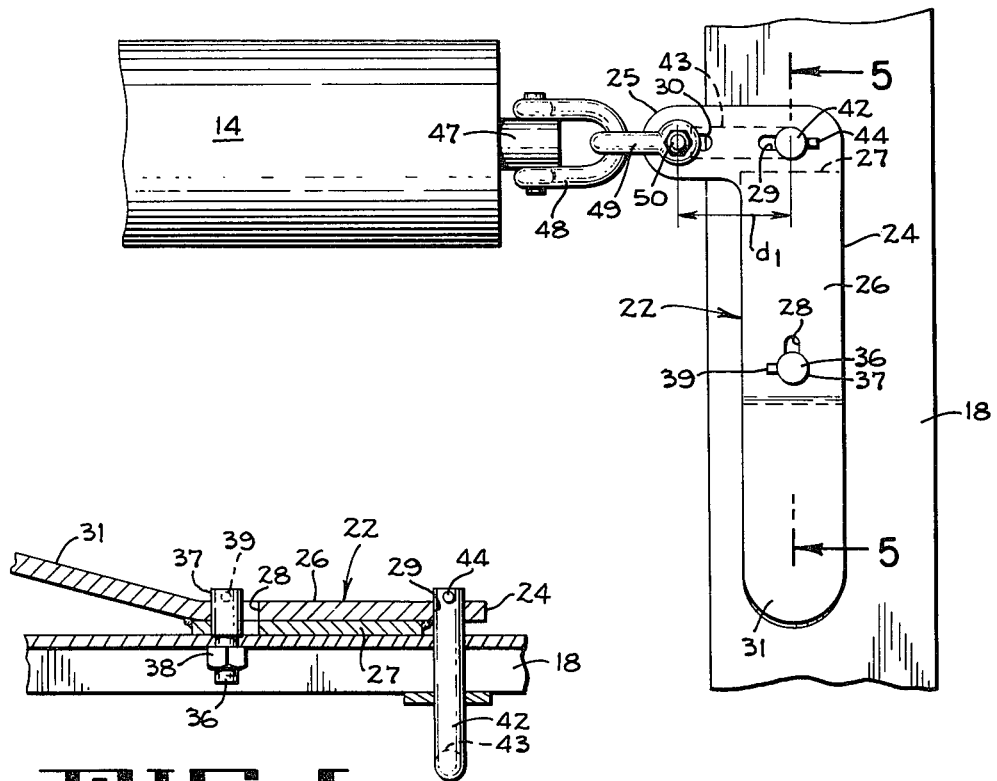
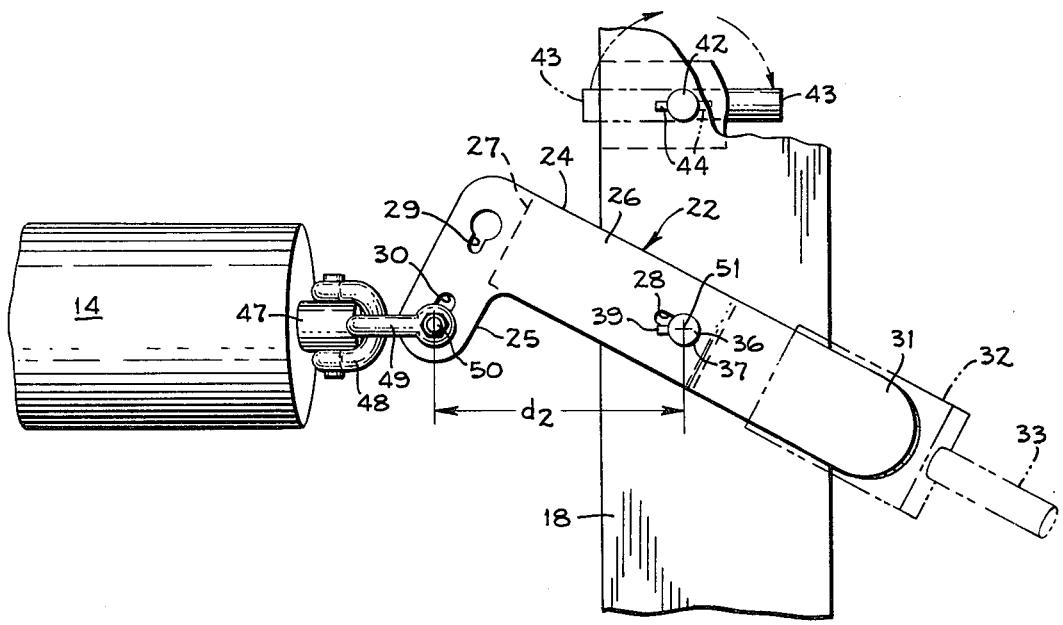

QUICK RELEASE TROUGHING ROLL MOUNTING

BACKGROUND OF THE INVENTION

1. Field of the Invention

This invention relates to a conveyor having an endless belt, that is supported by troughing rolls, to form a trough-like conveying surface. More specifically, the invention pertains to a mounting arm, that supports the troughing rolls in contact with the belt, and the mounting arm can be quickly released to lower the troughing rolls to a position clear of the belt.

2. Description of the Prior Art

Canadian Pat. No. 876,550 discloses a quick release mounting for troughing rolls that support an endless belt of a conveyor. This mounting includes a bell-crank lever that pivots in a vertical plane, to move the rolls between a raised position supporting the belt and a lowered position wherein the rolls are clear of the belt, enabling the rolls to be serviced without stopping the conveyor. The bell-crank lever pivots about a horizontal axis, that extends either laterally, or fore and aft, of the conveyor, while an adjacent inclined troughing roll applies a load that is obliquely angled to the lever. Thus, there is a tendency for the lever to skew on its pivotal axis. Such a tendency inhibits free pivotal movement and increases wear between the lever and the pivot pin.

U.S. Pat. No. 3,430,755 shows a fastening device for a troughing roll. The fastening device includes a link that pivots in substantially the same plane in which extends the line of force that is applied to the link by the adjacent troughing roll. A shackle, attached to the troughing roll, fits through an "L" shaped slot in the link and this shackle is slidable between two positions therein. In both positions, the shackle is aligned between the pivot pin and the troughing roll. Thus, there is no eccentric force on the link, and the force applied by the troughing roll must be overcome to pivot the link. It is necessary to use a special tool for pivoting the link so that the shackle can slide "over center" within the slot and move from a position where the troughing roll is elevated to a position where the troughing roll is lowered.

SUMMARY OF THE INVENTION

The purpose of the present invention is to provide a mechanism that holds troughing rolls in a position supporting a conveyor belt and the mechanism can be shifted, by hand without the use of any tools, to quickly release the troughing rolls from contact with the belt. To achieve this purpose, it is desirable to eliminate torsional forces on the mechanism that tend to resist releasing movement, to take advantage of the force applied by troughing rolls to pivot a mounting arm to a position releasing the rolls from belt contact, and to minimize loading on the pivot pin of the mounting arm when the troughing rolls are in a belt supporting position.

A mounting arm, that supports one end of a chain of troughing rolls, is mounted to pivot in a plane, that is generally parallel to the adjacent inclined side of a conveyor belt which is supported by the troughing rolls. This plane is substantially the same plane in which extends the line of force that is applied to the arm by the troughing rolls when the rolls are in a belt supporting position. Thus, torsional forces, on the mounting arm, that tend to resist pivotal movement of the arm are eliminated. The pivotal axis of the mounting arm is offset perpendicularly from the line of force that is applied to the arm by the troughing rolls when the troughing rolls are in a belt supporting position. Thus, the force that is applied to the arm by the troughing rolls is utilized to pivot the mounting arm, upon disengagement of a locking pin from the arm. The locking pin is positioned on the line of force that is applied to the arm by the troughing roll when the rolls are in a belt supporting position. Thus, the locking pin takes all of the loading that would otherwise be distributed to the pivot pin, and the effects of vibrations and oscillations are minimized.

BRIEF DESCRIPTION OF THE DRAWINGS

FIG. 1 is a perspective view, with portions broken away to show underlying structure, of a conveyor fragment, in which the present invention is embodied.

FIG. 2 is a fragmentary section, taken in elevation on the line 2—2 of FIG. 1, illustrating a mounting arm with troughing rolls that are located in contact with a conveyor belt.

FIG. 3 is a section similar to FIG. 2, but illustrating the mounting arm in a downward pivoted position, with the troughing rolls clear of belt contact.

FIG. 4 is a plan view of the mounting arm shown in FIG. 2.

FIG. 5 is a section taken on the line 5—5 of FIG. 4.

FIG. 6 is a plan view of the mounting arm, shown in FIG. 3, and this view illustrates, in phantom line, a tool for turning the mounting arm.

FIG. 7 is a perspective view of a modified form of mounting arm.

DESCRIPTION OF THE PREFERRED EMBODIMENTS

A portion of a conveyor 10 is shown in FIG. 1. This conveyor has an endless belt 11 that is trained about a drive roller, not shown, and about an idler roller, not shown. At longitudinally spaced intervals between these end rollers, a material carrying run, of the endless belt, is supported transversely by troughing rolls 12, 13 and 14, so that sides 15 and 16 of the belt are upwardly inclined, and the transverse cross-section of the belt defines a trough. The troughing rolls are coupled together, end to end, in a chain-like manner. These rolls are suspended, transversely of the conveyor, below the material carrying run of the belt. A frame member 17 extends longitudinally of the conveyor, along one side of the belt, and a frame member 18 similarly extends along the opposite side of the belt, for supporting the troughing rolls at their outermost ends.

The outermost end of each inclined troughing roll 12 is connected to the frame member 17 by a mounting 21. Similarly, the outermost end of each inclined troughing roll 14 is connected to the frame member 18 by a mounting 22. The mountings 21 and 22 are similar, with the exception of being adapted for use on opposite sides of the conveyor. Thus, only mounting 22 will be described in detail. Mounting 22, as shown in FIGS. 2 and 4, holds the troughing rolls 13 and 14 in a position supporting a material carrying run of the endless belt 11. In FIGS. 3 and 6, the mounting is shown in a position, pivoted from the position shown in FIGS. 2 and 4 thereby decreasing the span and lowering the suspension of the troughing rolls to a position where the rolls are clear from belt contact.

The mounting 22 has an "L" shaped arm 24, that includes a short leg 25 and a long leg 26, with a spacer plate 27 being welded to the underside of an intermediate portion of the long leg. A keyhole shaped slot 28 (FIGS. 4-6) is provided near the midpoint of the long leg and extends through the leg and the spacer plate, with the slot being aligned longitudinally of the long leg and pointing towards the short leg. A keyhole shaped slot 29 (FIGS. 4-6) is located at the intersection of the long and short legs, with the slot being aligned longitudinally of the short leg and pointing away from the long leg. An elongated slot 30 is located near the outer end of the short leg of the arm. An outer end portion 31 of the long leg is inclined relative to the remainder of the arm to facilitate gripping that portion of the arm's long leg with a socket head 32 of an extension handle 33, shown in phantom line in FIG. 6.

A pivot bolt 36, having a cylindrical head 37, fits through an opening in the frame member 18 and is held in place thereon by a nut 38 and a key pin 39. The key pin projects radially outward from the top portion of the cylindrical head and is aligned towards the conveyor belt 11. The arm 24 is positioned with the slot 28 being located over the cylindrical head and pointing towards the conveyor belt. In this position, the cylindrical head and key pin fit through the slot, as the arm is dropped towards the frame member. Upon rotation of the arm about the cylindrical head, as shown in FIG. 6, the key pin extends over the arm to lock the arm in place on the frame member.

As shown in FIGS. 2, 3 and 6, fitting through an opening in the frame member 18 is a locking pin 42 that has a perpendicularly bent handle portion 43, located below the frame member, and a radially projecting key pin 44 that extends in the opposite direction from the handle portion, at a location above the frame. The key pin retains the locking pin in the frame and can be removed for replacement of the locking pin. When the key pin projects laterally of the frame member towards the conveyor belt 11, as shown in FIG. 6, and the arm 24 is pivoted to the position on the frame member as shown in FIG. 4, the locking pin can be elevated through the slot 29 in the arm. The locking pin is then rotated 180° so that the key pin 44 projects over the top of the arm, as shown in FIG. 4, locking the arm in place on the frame member.

A shaft 47 projects axially from the outer end of the roller 14 and a shackle 48 is coupled to the end of the shaft. A clevis 49 extends through the shackle, and a bolt 50 extends through the ends of the clevis and through the elongated slot 30 in the arm 24, to couple the shackled end of the roller to the arm. It will be noted that the distance $d_1$ (FIG. 4), between the centers of the clevis bolt 50 and the locking pin 42, is less than the distance $d_2$ (FIG. 6), between the center of the clevis bolt and a pivot axis 51 that is located at the center of the pivot bolt 36. A line of force that is applied by the troughing rolls to the arm extends through the locking pin when the arm is holding the troughing rolls in a load supporting position and extends through the pivot bolt when the arm is in a released position.

In normal operation, the arm 24 is positioned with the long leg 26 extending longitudinally of the frame member 18, and the arm on frame member 17 is similarly positioned, as illustrated in FIG. 1 at each end of the conveyor portion 10. In this position, also shown in FIG. 2, the troughing rolls 12, 13 and 14 support the belt 11 so that the transverse cross-section of the belt defines a trough. Sometimes, a troughing roll will stick so as not to rotate on its end shafts, and thus, scrape the undersurface of the belt. In such case, a maintenance inspector, walking along the side of the conveyor, will turn the locking pin 42 by the handle 43, so that the key pin 44 can be withdrawn from the arm 24 through the elongated slot 29. Upon withdrawal of the locking pin, the arm pivots to the position shown in FIG. 6, in response to the load applied to the arm by the clevis bolt 50. Both arms can be released and the troughing rolls will drop, as illustrated in FIG. 1 by the troughing rolls that are located at the middle of the conveyor portion. The conveyor belt will still be supported by the adjacent troughing rolls that are spaced longitudinally of the conveyor from the dropped rolls. Thus, the conveyor belt can continue to run until the necessary repairs can be made.

If it is necessary to replace a troughing roll, the arms 24 of mountings 21 and 22 can be quickly removed along with the troughing rolls 12, 13 and 14. The arms are turned, until the keyhole shaped slot 28 fits about the key pin 39, and lifted upward from the frame member 18. After the troughing roll has been replaced, the arms are again fitted over the key pins 39 and turned so that the pins overlap the arms. The socket head 32 is fitted over the outer end portion 31 and the extension handle 33 is turned to position the long leg 26 of the arm to extend longitudinally of the frame members 18. Repairs can also be made with the troughing rolls in a lowered position by uncoupling the bolt 50 from the clevis 49 and working on the defective roll. The extension handle is used to hold the arm while the clevis and bolt are recoupled.

A modified form of the invention is shown in FIG. 7. Instead of having an outer end portion of the long leg of an arm upturned, as is the case with portion 31 of the arm 24, an arm 60 has a horizontal sleeve 61 that is welded to the outer end portion of the arm's long leg. A rod 62 can be inserted into the sleeve for turning the arm about a pivot axis 63. This form of arm can be used on either side of a conveyor. A suitable spacer, not shown, can be welded to the frame instead of the arm to provide clearance between the frame member 18 and the arm. This clearance is necessary for the locking pin 42 and the key pin 44 to be withdrawn from the arm, to release the arm. Instead of the pivot bolt 366, a pivot pin could be welded to the frame member.

In view of the foregoing description, it will be seen that the mountings 21 and 22, and such mountings modified in accordance with FIG. 7, hold the troughing rolls 12, 13 and 14 in a position supporting a conveyor belt 11. These mountings can quickly release the troughing rolls from belt contact with minimal effort by an operator. Torsional forces that tend to resist releasing movement have been eliminated. The force applied by the troughing rolls to the mounting is utilized for releasing the rolls from belt contact. Loading on the pivot bolt 36 is minimized when the troughing rolls are in a belt supporting position. The mountings, together with the troughing rolls, can be quickly removed from the frame members 17 and 18.

Although the best mode contemplated for carrying out the present invention has been herein shown and described, it will be apparent that modification and variation may be made without departing from what is regarded to be the subject matter of the invention.

What is claimed is:

1. In a conveyor having a longitudinal extending endless belt with a conveying surface in the form of a trough, a series of rotatable troughing rolls that are coupled together in a chain-like manner for supporting the belt, said troughing rolls extending laterally of the belt beneath the same with the outermost rolls being inclined to provide lateral support for the sides of the belt thereby shaping the belt in the form of a trough, and a quick release mounting for securing one end of an inclined troughing roll to a fixed frame, said mounting comprising:

a pivot bolt secured to the frame and a locking pin on said frame in longitudinally spaced relation therealong to said pivot bolt, an arm having pivot means and locking means spaced longitudinally thereon for independent cooperation with said frame pivot bolt and said frame locking pin, respectively, said arm pivot means cooperating with said frame pivot bolt to permit pivotal movement of said arm about the bolt in a plane that extends parallel with the adjacent inclined side of the belt, and between a first position holding the troughing rolls in load-receiving contact with the belt and a second position wherein the troughing rolls are lowered from belt contact, a coupling interconnecting one end of the inclined troughing roll and said arm, said inclined roll having an axis along which a line of force extends therefrom through said coupling and to said arm, with said force axis lying substantially in said pivotal plane of said arm, the centerline of said locking pin being positioned on said line of force when said arm is in said first position thereby to apply the troughing roll load to said locking pin, said locking means cooperating with said arm locking means for retaining said arm in said first position, said pivot bolt thereby being spaced laterally from said force axis when said arm is in said first position, and means mounting said locking pin for movement with respect to said arm locking means to release the arm for pivotal movement about said spaced pivot bolt to said second position removing the troughing rolls from the belt contact.

2. The quick release mounting described in claim 1 wherein said coupling interconnecting the troughing roll to the arm is located at a greater distance from the pivot bolt than the coupling is spaced from the locking pin.

3. The quick release mounting described in claim 2 wherein said arm has an L-shape defined by a long leg and a short leg, said locking means being located at the intersection of the legs, said troughing roll coupling being located at the outermost end of the short leg, and the pivot means being located near the midpoint of the long leg.

4. The quick release mounting described in claim 3 wherein the distal end of the long leg of the L-shaped arm is upwardly inclined from the frame and shaped to be received within a socket of a lever for repositioning the arm.

5. In a conveyor having an endless belt with a run for carrying material thereon, a plurality of troughing rolls being coupled together in a chain-like manner and extending transversely of the conveyor below the material carrying run for supporting the belt, said troughing rolls being axially inclined in opposite directions adjacent each side of the belt so that the belt's transverse cross section defines a trough, a pair of frame members being located on each side of the belt for supporting the troughing rolls, an arm being pivotally mounted on one frame member at a location opposite one end of the troughing rolls, means for attaching one end of the troughing rolls to the arm, means for attaching the opposite end of the troughing rolls to the opposite frame member to suspend the troughing rolls transversely between the frame member and the arm, and a locking pin for retaining the arm in a first position relative to the frame member wherein the troughing rolls are held in an elevated position supporting the belt, said locking pin being movable to release the arm for pivoting, the improvement comprising a pivot bolt interconnecting the arm and the frame upon which the arm pivots, said bolt holding the arm at fixed pivot point relative to the frame, said arm being pivotable in a plane generally parallel to the adjacent inclined side of the belt and substantially the same plane in which extends the line of force that is applied to the arm by the means for attaching the ends of the adjacent axially inclined troughing roll thereto when the arm is in the first position, said pivot bolt being offset perpendicularly from the line of force that is applied to the arm by the troughing roll attaching means when the arm is in the first position where it is retained by the locking pin, and upon removal of the locking pin said arm being pivotable in response to the force applied by the troughing roll attaching means to a second position decreasing the suspension span of the troughing rolls and lowering the rolls from contact with the belt, said locking pin being positioned on the line of force that is applied to the arm by the trough roll attaching means when the arm is in the first position, said troughing roll attaching means being connected to the arm at a location that is spaced a greater distance from the pivot bolt than the location is spaced from the locking pin, said locking pin being located at the intersection of the line of force that is applied to the arm by the troughing rolls and a line perpendicular thereto that intersects the pivot bolt, said arm having an L-shape defined by a long leg and a short leg, said locking pin being located at the intersection of the legs, said attaching means being connected to the arm at a location near the outer end of the short leg, said pivot bolt being located near the midpoint of the long leg, and a sleeve extending parallel to the short leg, said sleeve being fastened to the outer end of the long leg of the L-shaped arm for receiving a lever rod to reposition the arm.

* * * * *